United States Patent
Speck

(10) Patent No.: US 11,536,683 B2
(45) Date of Patent: Dec. 27, 2022

(54) HALF CELL AND METHOD FOR MANUFACTURING A HALF CELL

(71) Applicant: Endress+Hauser Conducta GmbH+Co. KG, Gerlingen (DE)

(72) Inventor: Matthäus Speck, Göpfersdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 23 days.

(21) Appl. No.: 17/117,214

(22) Filed: Dec. 10, 2020

(65) Prior Publication Data
US 2021/0172896 A1 Jun. 10, 2021

(30) Foreign Application Priority Data
Dec. 10, 2019 (DE) ...................... 10 2019 133 792.5

(51) Int. Cl.
*G01N 27/36* (2006.01)
*G01N 27/30* (2006.01)
(Continued)

(52) U.S. Cl.
CPC ............ *G01N 27/302* (2013.01); *C08L 83/00* (2013.01); *C09K 3/10* (2013.01); *G01N 27/30* (2013.01);
(Continued)

(58) Field of Classification Search
CPC ...... G01N 27/302; G01N 27/36; G01N 27/30; G01N 27/333; G01N 27/403; C08L 83/00; C09K 3/10
See application file for complete search history.

(56) References Cited

U.S. PATENT DOCUMENTS

| | | | |
|---|---|---|---|
| 2003/0150726 A1* | 8/2003 | West | G01N 27/36 204/435 |
| 2010/0126850 A1* | 5/2010 | Franzheld | G01N 27/36 204/291 |

(Continued)

FOREIGN PATENT DOCUMENTS

| | | | | |
|---|---|---|---|---|
| CN | 110071293 A | * | 7/2019 | ........ H01M 10/4235 |
| DE | 102005033727 A1 | | 1/2007 | |

(Continued)

OTHER PUBLICATIONS

Ling et al., Fabrication and characterization of a molecular adhesive layer for micro- and nanofabricated electrochemical electrodes, Microelectronic Engineering 67-68 (2013) 887-892. (Year: 2013).*

*Primary Examiner* — Joshua L Allen
*Assistant Examiner* — Shizhi Qian
(74) *Attorney, Agent, or Firm* — Christopher R. Powers; Endress+Hauser (USA) Holding, Inc.

(57) ABSTRACT

A half cell for an electrochemical sensor includes: a housing having a chamber, wherein the chamber includes an electrolyte; an electrically conductive lead in contact with the electrolyte; and a closure element connecting the lead to the housing, wherein the lead has a coating, and the coating includes molecules including a first functional group, which enables the molecule to interact chemically with the lead, and a second functional group different from the first functional group, which enables the molecule to interact chemically with the closure element, wherein a first portion of the molecules with the first functional group are in an intermolecular connection with the lead and the first portion of the molecules and/or a second portion of the molecules with the second functional group are in an intermolecular connection with the closure element.

16 Claims, 3 Drawing Sheets

(51) Int. Cl.
    *G01N 27/333*     (2006.01)
    *G01N 27/403*     (2006.01)
    *C08L 83/00*     (2006.01)
    *C09K 3/10*     (2006.01)

(52) U.S. Cl.
    CPC ........... *G01N 27/333* (2013.01); *G01N 27/36* (2013.01); *G01N 27/403* (2013.01)

(56) References Cited

U.S. PATENT DOCUMENTS

| | | | |
|---|---|---|---|
| 2012/0152765 A1* | 6/2012 | Trapp | G01N 27/4163 204/415 |
| 2012/0168321 A1* | 7/2012 | Buschnakowski | G01N 27/401 204/415 |
| 2014/0144776 A1* | 5/2014 | Wilhelm | G01N 27/4035 204/403.06 |
| 2016/0178556 A1* | 6/2016 | Hanko | G01N 27/30 204/414 |
| 2016/0216230 A1* | 7/2016 | Wilke | G01N 27/333 |
| 2017/0160228 A1* | 6/2017 | Pechstein | G01N 27/333 |

FOREIGN PATENT DOCUMENTS

| | | |
|---|---|---|
| DE | 102008055107 A1 | 7/2010 |
| DE | 102011089671 A1 | 6/2013 |
| DE | 102017127656 A1 | 5/2019 |

\* cited by examiner

HALF CELL AND METHOD FOR MANUFACTURING A HALF CELL

CROSS-REFERENCE TO RELATED APPLICATION

The present application is related to and claims the priority benefit of German Patent Application No. 10 2019 133 792.5, filed on Dec. 10, 2019, the entire contents of which are incorporated herein by reference.

TECHNICAL FIELD

The present disclosure relates to a half cell and a method for manufacturing a half cell.

BACKGROUND

In analytical measurement technology, for example, in the fields of water management and environmental analysis and in industry, for example, in food technology, biotechnology and pharmaceuticals, as well as for various laboratory applications, measurands such as pH value, conductivity or the concentration of analytes such as ions or dissolved gases in a gaseous or liquid measurement medium are of great importance. These measurands can be detected and/or monitored, for example, by means of electrochemical sensors, such as potentiometric, amperometric, voltammetric or coulometric sensors, or else conductivity sensors.

One type of electrochemical sensor is pH glass sensors, which are usually used as one-rod pH measuring chains.

A standard one-rod pH measurement chain is constructed, as presented in simple terms, from two half cells spatially separated from one another, namely a so-called "reference half cell" and a so-called "pH half cell." The reference and pH half cells usually consist of two concentrically arranged glass tubes or glass containers, which form two separate chambers. The pH half cell is formed here by the mostly internal glass tube with a pH-sensitive glass membrane and a pH derivative of, for example, (silver (Ag)/silver chloride (AgCl)) located in a defined electrolyte. In this case, the reference half cell is formed by the outer glass tube that is present with a diaphragm and a reference lead made of, for example (Ag/AgCl), which is likewise located in a defined electrolyte.

When the pH single-rod measuring chain with a measuring chain zero point at pH 7 is in an aqueous solution different from pH 7, a potential difference (voltage) different from zero is formed between the half cells (at the pH glass membrane), which can be measured via the leads. An electronics unit is connected to the leads in order to convert the potential difference into a usable signal, for example, a pH value.

In order to seal the electrodes from the environment on a side remote from the measuring medium and in order to avoid the formation of additional potentials by environmental factors, e.g., moisture penetrating into the half cells, the half cells must be closed off from the electronics unit and the sensor plug head by, among other things, (glass) fusion or polymer seals, for example, by potting compounds such as resins or rubber preparations. For this purpose, various layers of polymers are usually introduced between the glass body of the half cells and a housing of the electronics unit. The layer sealing against moisture is usually a silicone polymer since it forms a leak-tight connection to glass. A disadvantage is that silicone does not form a sealing connection to a standard silver lead. Therefore, the portion of the lead located in the sealing layer consists of a platinum wire encased in a glass pill, e.g., as disclosed in DE 10 2017127656 A1. A platinum wire is fused to the silver wire since platinum ($8.8 \times 10^{-6}$ K$^{-1}$) and the glass used (ca. $9 \times 10^{-6}$ K$^{-1}$) have a comparable coefficient of expansion ($\alpha$, CTE) (refer to DIN ISO 7991). A similar coefficient of expansion promotes sealing even under varying temperature conditions.

For cost and manufacturing reasons, it is desirable to replace the platinum portion of the lead with a lead that is completely made of silver wire. For this purpose, it is necessary to equip the silver wire to the polymer seal at the point located in the encapsulation in an integral manner, i.e., in a positive-locking, force-fitting or firmly bonded manner. One possibility is to coat the silver wire with a corresponding enamel, glass capillary or glass pill adhered to the silver wire in a known manner. However, such silver glazings/enamels often, among other things due to the ductility of the metal, have a pronounced susceptibility to breakage/defect. This leads to more complex manufacturing processes with an increased reject potential. Furthermore, failure of the electrode/sensor seal can easily occur due to the introduction of slight soiling on the glass encapsulation contact surface.

SUMMARY

It is therefore an object of the present disclosure to provide a pH glass sensor which is simple, safe and durable. This object is achieved by a pH glass sensor according to the present disclosure.

A pH glass sensor according to the present disclosure comprises:

A housing having a chamber, wherein the chamber includes an electrolyte;

A lead that is electrically conductive and in contact with the electrolyte; and

A closure element connecting the lead to the housing.

The lead has a coating and the coating comprises molecules, which have a first functional group, which enables the molecule to interact chemically with the lead, and a second functional group which is different from the first functional group, which enables the molecule to interact chemically with the closure element.

A first portion of the molecules is in intermolecular connection with the first functional group with the lead, and the first portion of the molecules and/or a second portion of the molecules are in intermolecular connection with the second functional group with the closure element.

The pH glass sensor according to the present disclosure makes it possible for the closure element to be integrally formed between glass element and electronics unit. The pH glass sensor is thus durable, safe and reliable.

In one embodiment of the present disclosure, the lead comprises a metal. The lead preferably comprises a semi-precious metal. The lead particularly preferably comprises a noble metal.

In one embodiment of the present disclosure, the closure element comprises a material from the group of duromers, a polyester derivative, a polyolefin derivative, a polyurethane or another thermoplastic material or an elastomer, for example, silicone.

In one embodiment of the present disclosure, the coating comprises a material from the substance classes of carboxylic acids, thiocarboxylic acids, alcohols, thiols, amines, ethers, thioethers, disulfides and oligosulfides, silanes, siloxanes, nitriles, isonitriles, rhodanides, isocyanates, isothiocyanates, carbamates, urea derivatives or thiourea derivatives, or the coating is nitrogen—or sulfur-containing, wherein the coating preferably comprises 3-mercaptopropyltrimethoxysilane, 3-mercaptopropyltriethoxysilane, bis (3-(triethoxysilyl)propyl)disulfate, mercaptomethyldiethoxysilane, 11-mercaptoundecyltrimethoxysilane, 3-thiocyanatopropyltriethoxysilane or bis(triethoxylsilylpropyl)tetrasulfide.

In one embodiment of the present disclosure, the housing comprises glass. The housing may comprise a glass having a processing temperature which is below 1100° C., or below 1080° C., or particularly below 1050° C.

The object is further achieved by a method for manufacturing a half cell according to the present disclosure. A method according to the present disclosure comprises the following steps:

Providing a lead, a closure element, a coating material and a housing having a chamber,
wherein the coating material comprises molecules having a first functional group and a second functional group different from the first functional group,
wherein the first functional group enables the molecules to interact chemically with the lead,
and the second functional group enables the molecules to interact chemically with the closure element or a precursor preparation of the closure element,
Applying the coating material to the lead, so that a coating is formed on the lead and a first portion of the molecules of the coating form an intermolecular bond with the first functional group with the lead,
Filling the chamber with an electrolyte,
Introducing the lead into the chamber of the housing, so that the lead comes into contact with the electrolyte,
Connecting the closure element or a precursor preparation of the closure element to the coating disposed on the lead and the housing such that the first portion of the molecules of the coating and/or a second portion of the molecules of the coating form an intermolecular bond with the second functional group form with the closure element.

In one embodiment of the present disclosure, the step of connecting the closure element to the coating arranged on the lead and the housing comprises a condensation reaction. The condensation reaction may comprise vulcanization.

In one embodiment of the present disclosure, the step of connecting the closure element to the coating arranged on the lead and the housing takes place by the closure element being cast with the lead and the housing.

In one embodiment of the present disclosure, the step of connecting the closure element to the coating arranged on the lead and the housing takes place in such a way that the lead runs through the closure element.

In one embodiment of the present disclosure, the step of applying the coating material to the lead comprises immersing or wetting the lead with a solution of the coating material.

In one embodiment of the present disclosure, a step of drying the coating takes place between the step of applying the coating material to the lead and the step of connecting the closure element to the coating disposed on the lead and the housing.

In one embodiment of the present disclosure, a catalyst is present in the material of the closure element in the step of connecting the closure element to the coating arranged on the lead and the housing.

In one embodiment of the present disclosure, the lead comprises silver and the housing comprises glass and the closure element comprises silicone and the coating material is nitrogen—or sulfur-containing. The coating material 3 may comprise mercaptopropyltrimethoxysilane, 3-mercaptopropyltriethoxysilane, bis(3-(triethoxysilyl)propyl)disulfate, mercaptomethylmethyldiethoxysilane, 11-mercaptoundecyltrimethoxysilane, 3-thiocyanatopropyltriethoxysilane or bis(triethoxylsilylpropyl)tetrasulfide.

The object is furthermore achieved by an electrochemical sensor unit according to the present disclosure. An electrochemical sensor according to the present disclosure comprises:
a first half cell according to the present disclosure,
a second half cell according to the present disclosure,
an electronics unit electrically connected to the lead of the first half cell and the lead of the second half cell.

BRIEF DESCRIPTION OF THE DRAWINGS

The present disclosure will be explained in more detail on the basis of the following description of the figure. The following are shown.

DETAILED DESCRIPTION

Figure 1:
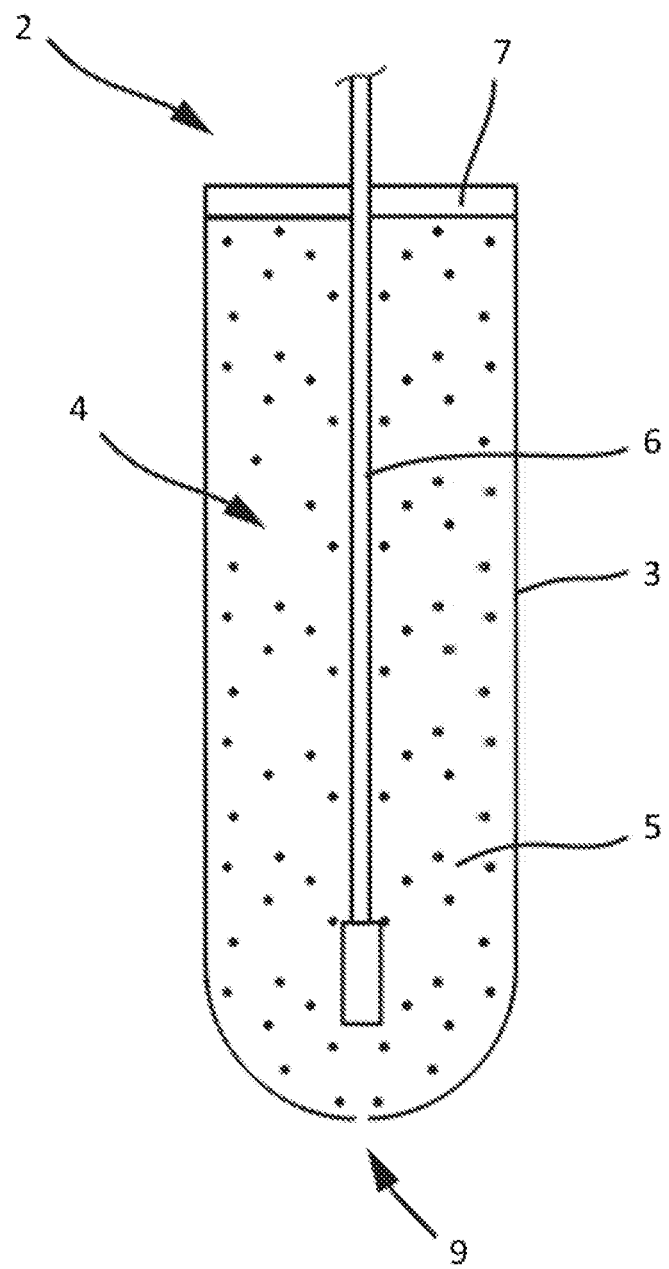
FIG. 1 shows a schematic representation of a half cell according to the present disclosure for an electrochemical sensor.

FIG. 1 schematically shows a construction of a half cell 2 according to the present disclosure for an electrochemical sensor 1. The half cell shown is suitable as a reference electrode for the electrochemical sensor 1. For pH measurement, the reference electrode can be introduced into a medium, for example a measuring liquid, together with a further half cell, which serves as a pH electrode (not shown). In this case, the pH electrode and the reference electrode each form a potentiometric half cell of a potentiometric measuring chain. The measuring chain voltage, i.e., the voltage detectable between the pH electrode and the reference electrode, is a measure of the pH of the medium. The reference electrode can likewise be used in other electrochemical sensors, e.g., in potentiometric sensors for detecting the concentration of ions other than hydronium ion and in amperometric or voltammetric sensors.

The half-cell 2 comprises a housing 3 which comprises glass, for example, or consists of glass, glass ceramic, ceramic or plastic. The housing 3 has a chamber 4 which is at least partially filled with an electrolyte 5 (see FIG. 1). A closure element 7 is adapted to close the housing 3. The closure element 7 thus closes the chamber 4 of the housing 3 in such a way that the electrolyte 5 cannot leak out of the housing 3.

In an embodiment, the housing 3 comprises a glass having a processing temperature which is below 1100° C. The processing temperature of the glass may be below 1080° C., more preferably below 1050° C. in certain embodiments. Processing temperature is understood to mean a temperature at which the glass can be deformed. At this temperature, the glass thus has a certain viscosity, which allows deformation of the glass. An electrochemical transition 9 is arranged in the wall of the chamber 3 and forms an electrolytic connection between the electrolyte 5 and the medium.

A lead 6 is introduced into the chamber 4. The lead 6 is electrically conductive and is in contact with the electrolyte 5. The lead 6 serves to discharge the potential forming at the potential-forming lead 6. The lead 6 is led out through the closure element 7 to an electronics unit 10 (see FIG. 3). In the example shown in FIG. 1, the lead 6 is led out of the chamber 4 through the closure element 7 by means of a (single) wire. The lead 6 is made of, for example, a noble metal or a semi-precious metal. For example, the lead 6 comprises gold, platinum, silver or copper. Preferably, the entire lead 6 is made of a silver wire.

Figure 2:
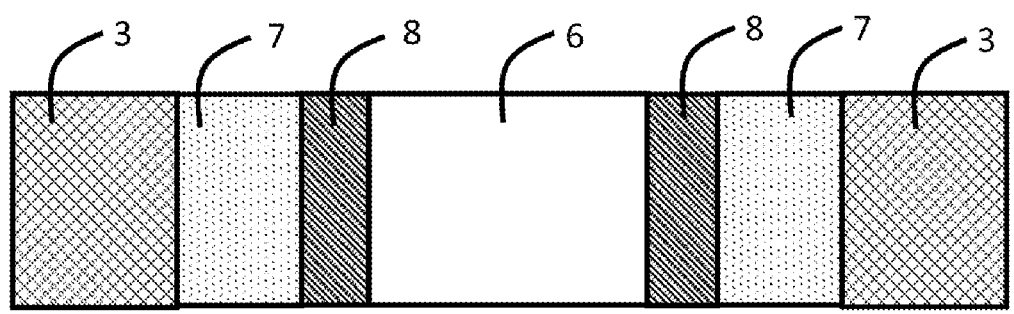
FIG. 2 shows an enlarged schematic diagram of a connection between the lead, the coating, the closure element and the housing.

FIG. 1 and FIG. 2 show the closure element 7. The closure element 7 closes the housing 3, as shown in FIG. 1. More specifically, the closure element 7 connects the lead 6 to the housing 3, as detailed in FIG. 2. The closure element 7 is for example a polymer seal. The closure element 7 comprises a material from the group of elastomers (e.g. a polysiloxane), from the group of duromers (e.g. an epoxy resin) or from a polyacrylate, another polyester derivative, a polyolefin derivative, a polyurethane or another thermoplastic material. The closure element 7 preferably comprises silicone or silicone rubber. Silicone is well-suited for producing a fluid-tight connection with, for example, glass or ceramic. The closure element 7 is realized, for example, in the form of a silicone casting.

FIG. 2 also shows a coating 8 on the lead 6. The coating 8 comprises organic molecules which have a first functional group, which enables the molecule to interact chemically with the lead 6, and a second functional group which is different from the first functional group, and which enables the molecule to interact chemically with the closure element 7 or its precursor preparations. A first portion of the molecules is in an intermolecular connection with the first functional group with the lead 6 and the first portion of the molecules and/or a second portion of the molecules are in an intermolecular connection with the second functional group with the closure element 7. The coating 8 comprises a material which has carboxyl groups. The coating 8 comprises, for example, carboxylic acids, thiocarboxylic acids, alcohols, thiols, amines, ethers, thioethers, disulfides and oligosulfides, silanes, siloxanes, nitriles, isonitriles, rhodanides, isocyanates, isothiocyanates, carbamates, urea derivatives or thiourea derivatives. The coating particularly preferably comprises (3-mercaptopropyl)trimethoxysilane in certain embodiments.

Precursor preparation is understood to mean, for example, a non-cured closure element 7. For example, the precursor preparation is a liquid silicone rubber which contains acetic acid as catalyst, for example. Other precursor preparations are conceivable.

Figure 3:
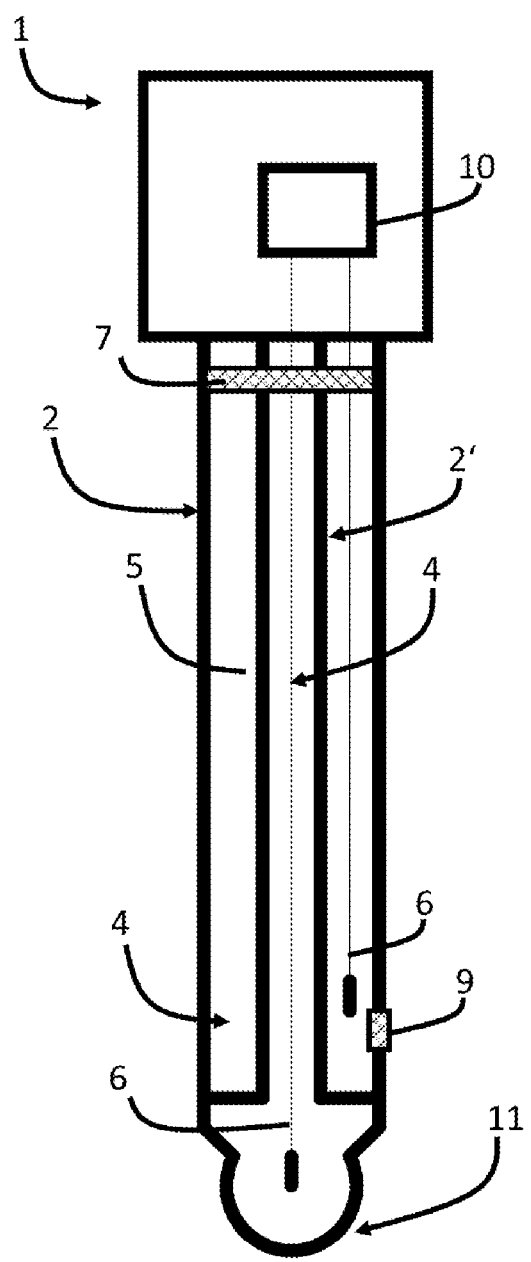
FIG. 3 shows a schematic representation of an electrochemical sensor having a plurality of half cells from FIG. 1.

FIG. 3 shows an embodiment of an electrochemical sensor 1 with two half cells 2, 2'. The two half cells 2 2' differ from one another in that a transition 9 is arranged in a first half cell 2 and the other half cell 2' has a membrane 11. The leads 6 of both half cells 2, 2' are led out of the housing 3 to an electronics unit 10 and are electrically connected to the electronics unit 10. The closure element 7 connects the lead 6 to the housings 3. The two half cells 2, 2' are arranged in such a way that the first half cell 2 is partially concentrically enclosed by the second half cell 2'.

The electronics unit 10 may be configured to perform certain operations comprising a control and evaluation structure to operate upon potentials of the half cell 2 or half cells 2, 2' to determine a measured value. In certain embodiments, the electronics unit 10 forms a portion of a processing subsystem that includes one or more computing devices having memory, processing, and/or communication hardware. The electronics unit 10 may be a single device or a distributed device, and the functions of the electronics unit 10 may be performed by hardware and/or software. The electronics unit 10 can include one or more Arithmetic Logic Units (ALUs), Central Processing Units (CPUs), memories, limiters, conditioners, filters, format converters, or the like which are not shown to preserve clarity. In one form, the electronics unit 10 is programmable to execute algorithms and processes data in accordance with operating logic that is defined by programming instructions, such as software or firmware. Alternatively or additionally, operating logic for the electronics unit 10 can be at least partially defined by hardwired logic or other hardware, for example, using an Application-Specific Integrated Circuit (ASIC) of any suitable type. It should be appreciated that the electronics unit 10 can be exclusively dedicated to operate upon potentials of the half cell 2 or half cells 2, 2' to determine a measured value or may be further used in the regulation, control, and activation of one or more other subsystems or aspects of the electrochemical sensor 1.

Hereinafter, the manufacturing method of the half cell 2 according to the present disclosure will be described.

First, the lead 6, the closure element 7, a coating material, also called primer, for forming the coating 8 and the housing 3 having the chamber 4 are provided.

The coating material comprises molecules having a first functional group capable of being in an intermolecular connection with the lead 6 and having a second functional group different from the first functional group and adapted to interact with the closure element 7. The coating material comprises carboxy groups. The coating material 3 preferably comprises 3-mercaptopropyltrimethoxysilane, 3-mercaptopropyltriethoxysilane, bis(3-(triethoxysilyl)propyl)disulfate, mercaptomethylmethyldiethoxysilane, 11-mercaptoundecyltrimethoxysilane, 3-thiocyanatopropyltriethoxysilane and bis(triethoxylsilylpropyl)tetrasulfide.

The housing 3 used is for example a glass having a processing temperature (in accordance with DIN ISO 7884-1) which corresponds to or is similar to the melting point of the lead 6. Similarly, a temperature difference therebetween of less than 150° C., preferably less than 100° C., is understood.

In a next step, the coating material is applied to the lead 6, so that a coating 8 is formed on the lead 6. This step occurs, for example, by immersing the lead 6 in a solution of the coating material. The solution is, for example, an amount of the coating material diluted in alcohol, or other common solvent. The step of applying the coating material can also be effected by means of other known material-applying methods, for example spray coating or various printing methods.

When the coating material is applied, a first portion of the molecules of the coating 8 with its first functional group forms an intermolecular bond with the lead 6. For example, when silver is used as the lead 6, the surface of the lead 6 is chemically modified by the coating material (e.g., forming AgS interactions). The now modified silver surface of the lead 6 thus has hydrolyzable or even partially hydrolyzed silicic acid ester functionalities (in contact with the closure element 7) which crosslink with the closure element 7 during the vulcanization of the silicone casting filled to seal the housing 3 and thus ensure the leak tightness of the half cell 2.

The coating 8 thus outstandingly adheres to the lead 6. The coating 8 is preferably applied only in a section of the lead 6 on which later the closure element 7 will contact the lead 6.

After the application of the coating material, an optional step of drying the coating 8 can take place.

In a next step, the chamber 4 of the housing 3 is filled with the electrolyte 5. The chamber 4 is preferably filled only below the position of the coating 8 when the lead 6 is inserted into the housing 3. This step of filling with electrolyte 5 can take place at any point in time before the housing 3 is closed by the closure element 7.

Next, the lead 6 is inserted into the chamber 4 of the housing, so that the lead 6 comes into contact with the electrolyte 5. If the electrolyte 5 is carried out after the step of introducing the lead 6 into the chamber 4, sufficient electrolyte 5 must of course be filled into the chamber 4, so that the lead 6 comes into contact with the electrolyte 5.

Finally, the closure element 7 is connected to the coating 8 arranged on the lead 6 and the housing 3, so that the first part of the molecules of the coating and/or a second part of the molecules of the coating with the second functional group form an intermolecular bond with the closure element 7. As stated above, the closure element 7 is preferably made of silicone.

The step of connecting the closure element 7 to the coating 8 arranged on the lead 6 and the housing 3 comprises, for example, a vulcanization reaction, preferably a condensation reaction. Acetic acid, for example, can be present as catalyst in the silicone preparation. The closure element 7 is cast, for example, with the coating 8 arranged on the lead 6 and the housing 3. The closure element 7 is preferably connected to the lead 6 and the housing 3 in such a way that the lead 6 projects through the closure element 7.

One advantage of the half cell 2 according to the present disclosure is that the manufacturing costs of the half cell 2 can be kept low. By means of the coating 8 it is possible to use a closure element 7 which has excellent adhesion properties with the housing 3 and with the coating 8. Thus, a secure and tight seal is established between the lead 6 and the housing 3. A silver wire can thus be used as the lead 6, for example.

The present disclosure makes it possible to seal a half cell 2 containing an Ag/AgCl derivative by chemical functionalization of the Ag-wire surface, which thus ensures the adhesion of the silver wire directly in the silicone casting of the polymer seal.

The invention claimed is:

1. A half cell for an electrochemical sensor, the half cell comprising:
   a housing defining a chamber, wherein the chamber contains an electrolyte;
   a lead that is electrically conductive and is in contact with the electrolyte; and
   a closure element connecting the lead to the housing in a sealed manner, wherein the lead includes a coating comprising molecules that include a first functional group selected to enable the molecules of the coating to interact chemically with the lead and that include a second functional group, which is different from the first functional group, selected to enable the molecules to interact chemically with the closure element,
   wherein a first portion of the molecules with the first functional group are in an intermolecular connection with the lead, and wherein the first portion of the molecules and/or a second portion of the molecules with the second functional group are in an intermolecular connection with the closure element.

2. The half cell of claim 1, wherein the lead comprises a metal, a semi-precious metal or a noble metal.

3. The half cell of claim 1, wherein the closure element comprises a material from a group of duromers, a polyester derivative, a polyolefin derivative, a polyurethane or another thermoplastic material, and an elastomer.

4. The half cell of claim 1, wherein the closure element comprises silicone.

5. The half cell of claim 1, wherein the coating comprises a material from substance classes of carboxylic acids, thiocarboxylic acids, alcohols, thiols, amines, thioethers, disulfides and oligosulfides, silanes, siloxanes, nitriles, isonitriles, rhodanides, isocyanates, isothiocyanates, carbamates, urea derivatives or thiourea derivatives, or
   wherein the coating is nitrogen-containing or sulfur-containing, wherein the coating comprises 3-mercaptopropyltrimethoxysilane, 3-mercaptopropyltriethoxysilane, bis(3-(triethoxysilyl) propyl) disulfate, mercaptomethylmethyldiethoxysilane, 11-mercaptoundecyltrimethoxysilane, 3-thiocyanatopropyltriethoxysilane or bis(triethoxylsilylpropyl)tetrasulfide.

6. The half cell of claim 1, wherein the housing comprises glass having a processing temperature which is below 1100° C.

7. An electrochemical sensor, comprising:
   a first half cell according to the half cell of claim 1;
   a second half cell according to the half cell of claim 1; and
   an electronics unit electrically connected to the lead of the first half cell and to the lead of the second half cell.

8. The half cell of claim 1, wherein the lead comprises silver.

9. A method of manufacturing the half cell of claim 1, the method comprising:
   providing the lead, the closure element, and the housing defining the chamber;
   applying the coating to the lead such that the coating is formed on the lead and the first portion of the molecules of the coating having the first functional group forms an intermolecular connection with the lead, wherein the coating comprises the molecules having the first functional group and the second functional group different from the first functional group, wherein the first functional group enables the molecules to interact chemically with the lead, and wherein the second functional group enables the molecules to interact chemically with the closure element or with a precursor preparation of the closure element;
   filling the chamber at least partially with the electrolyte;
   introducing the lead into the chamber of the housing such that the lead comes into contact with the electrolyte; and
   connecting the closure element or the precursor preparation of the closure element to the coating disposed on the lead and to the housing such that the first portion of the molecules of the coating and/or the second portion of the molecules of the coating form the intermolecular connection with the closure element.

10. The method of claim 9, wherein connecting the closure element to the coating applied on the lead and to the housing includes a condensation reaction.

11. The method of claim 9, wherein connecting the closure element to the coating applied on the lead and to the housing is performed by the closure element being cast with the lead and the housing.

12. The method of claim 9, wherein connecting the closure element to the coating applied on the lead and to the housing is performed such that the lead extends through the closure element.

13. The method of claim 9, wherein applying the coating to the lead comprises immersing the lead into or wetting the lead with a solution of the coating.

14. The method of claim 9, further comprising drying the coating, which is performed between applying the coating to the lead and connecting the closure element to the coating on the lead and to the housing.

15. The method of claim 9, wherein connecting the closure element to the coating on the lead and the housing includes a catalyst present in the closure element.

16. The method of claim 9, wherein the lead comprises silver, the housing comprises glass, the closure element comprises silicone, and the coating is nitrogen—containing or sulfur-containing, wherein the coating comprises 3-mercaptopropyltrimethoxysilane, 3-Mercaptopropyltriethoxysilane, bis(3-(triethoxysilyl)propyl)di sulfate, mercaptomethylmethyldiethoxysilane, 11-mercaptoundecyltrimethoxysilane, 3-thiocyanatopropyltriethoxysilane or bis(triethoxylsilylpropyl)tetrasulfide.

* * * * *